(No Model.) 2 Sheets—Sheet 1.

A. J. HELVERN & W. B. SCHWALM
SEED DROPPING ATTACHMENT FOR PLANTERS.

No. 443,443. Patented Dec. 23, 1890.

WITNESSES: Chas. Nida. C. Sedgwick.

INVENTOR: A. J. Helvern, W. B. Schwalm, BY Munn & Co. ATTORNEYS

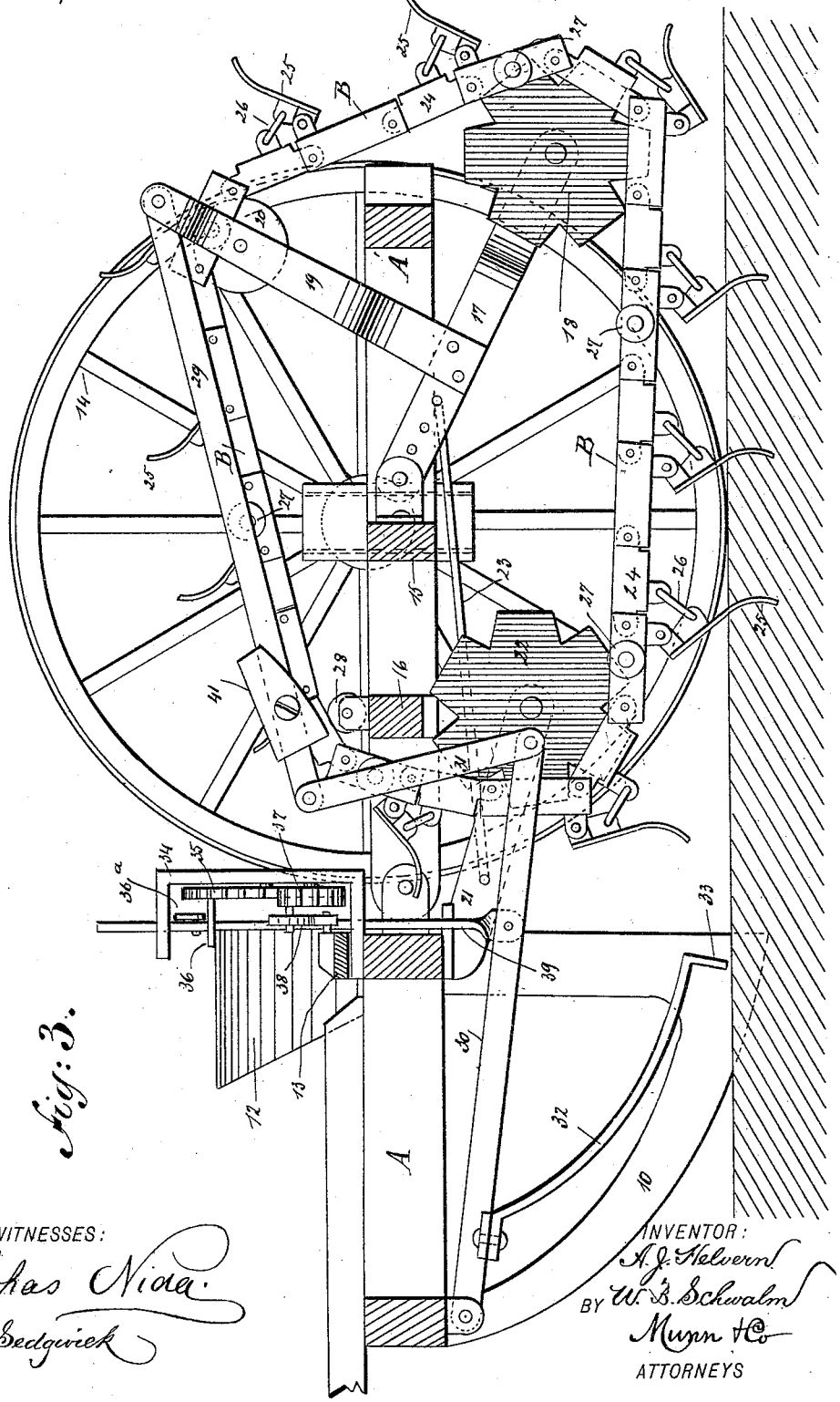

UNITED STATES PATENT OFFICE.

ALBERT J. HELVERN AND WILLIAM B. SCHWALM, OF WALTON, INDIANA.

SEED-DROPPING ATTACHMENT FOR PLANTERS.

SPECIFICATION forming part of Letters Patent No. 443,443, dated December 23, 1890.

Application filed August 27, 1890. Serial No. 363,196. (No model.)

*To all whom it may concern:*

Be it known that we, ALBERT J. HELVERN and WILLIAM B. SCHWALM, of Walton, in the county of Cass and State of Indiana, have invented a new and Improved Seed-Dropping Attachment for Planters, of which the following is a full, clear, and exact description.

Our invention relates to an improved seed-dropping attachment for planters, and has for its object to provide a simple and effective mechanism capable of being attached to planters of any description; and a further object of the invention is to connect with the seed-dropping mechanism a marking device which will effectually check the rows.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
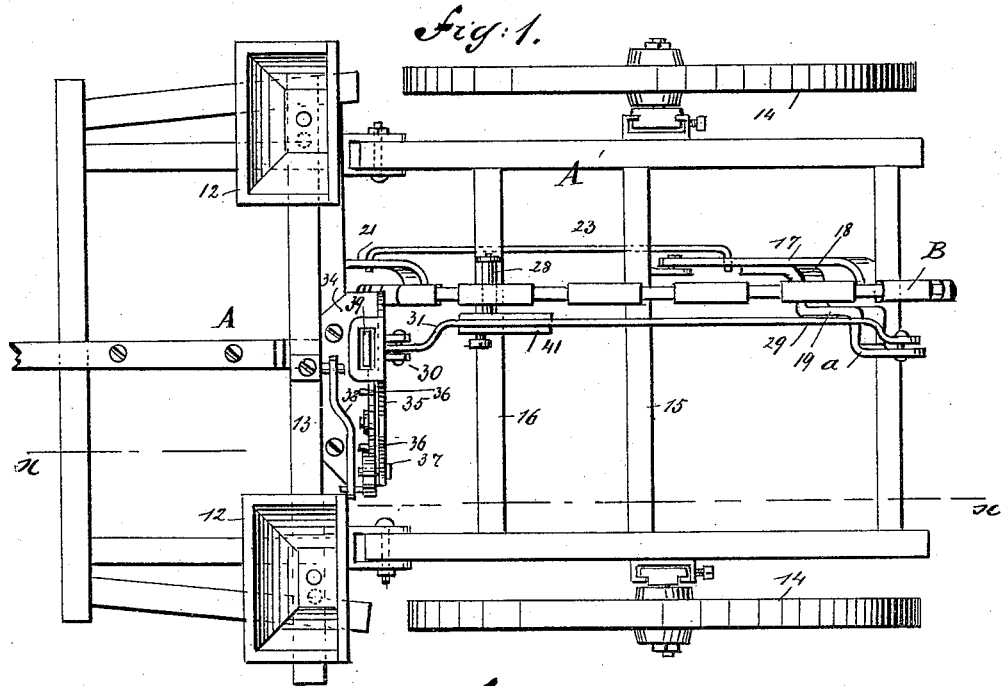
Figure 2:
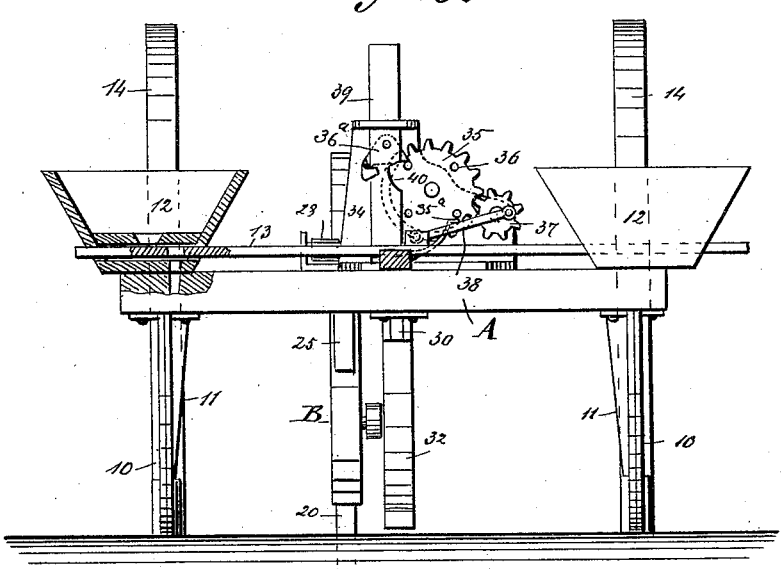

Figure 1 is a plan view of the implement having the device applied thereto. Fig. 2 is a front elevation, the seed-box being partially broken away at one end; and Fig. 3 is a longitudinal section on the line $x\ x$ of Fig. 1.

The frame is constructed in two practically rectangular sections A and A', the section A' being the rear section and hinged to the forward section. The forward section has attached thereto the usual runners 10, and at the rear of the runners the seed spouts or chutes 11 are located, which spouts have connection with seed-boxes 12 of any approved construction, which seed-boxes are located upon the forward frame-section, and one drop-slide 13 has movement in both boxes, as is best shown in Fig. 2. The rear section A' is supported by wheels 14, which wheels are attached to the section in such manner that the said section may be raised or lowered relatively to the wheels. The rear section, which is the hinged section, is provided with two or more, preferably two, intermediate cross-bars 15 and 16, and to the intermediate cross-bar 15 one end of a downwardly-extending arm 17 is pivoted, the lower end of which arm is slightly curved inward, and to the curved portion of the arm a sprocket or chain wheel 18 is pivoted. An upwardly-curved arm 19 is attached at its lower end to the downwardly-extending arm 17, and the upwardly-extending arm 19 at its upper end is curved horizontally outward and thence vertically upward in the direction of the rear, as is best illustrated at $a$ in Fig. 1.

Upon the outer face of the upper arm 19, near its upper curve, a small chain or friction pulley 20 is pivoted, which pulley is in alignment with the larger chain-wheel 18. An arm 21 is secured to the rear cross-bar of the forward section A of the frame, and the said arm 21 is projected downward and rearward beneath the hinged frame-section A'. To the lower extremity of the arm 21 a chain-wheel 22 is fulcrumed, the chain-wheels 22 and 18 being in horizontal alignment. The arms 17 and 21 are adjustably connected by a rod or link 23.

An endless chain B is made to travel over the chain-wheels 18, 20, and 22, and to one end of preferably every other link 24 of the chain one end of a downwardly-curved finger 25 is pivoted, the said finger being connected with the lower edge of the next link by a rod or link 26, and at predetermined intervals at one side of the endless chain friction-rollers 27 are pivoted upon suitable pins, which friction-rollers regulate the dropping of the seed and may be arranged close together when the seed is to be so dropped, or as far apart as the planter may desire. The endless chain, in addition to passing over the chain-wheels, also passes over a friction-pulley 28, which pulley is journaled upon the forward intermediate cross-bar 16 of the hinged section of the frame.

One end of a rod or bar 29 is pivoted to the upper extremity of the upwardly-extending arm 19, and the said bar is extended forward over the hinged section A' of the frame, its inner end being pivotally united with the rear end of the lever 30 by a suitable connecting-rod 31, the lever 30 at its forward end being fulcrumed at or near the central portion of the forward cross-bar of the front frame-section A.

To the lever 30, near its fulcrum, the upper end of a marker 32 is secured, which marker consists, preferably, of a strip of spring metal curved downward and rearward and terminating at its lower extremity in an essentially-vertical foot 33, which foot is adapted to engage with the ground between the chutes or spouts 11 of the seed-boxes and in horizontal alignment with their lower ends.

Upon the rear cross-bar of the forward section A of the frame an angle plate or bracket 34 is bolted, and upon the vertical member of the bracket or angle-plate a spur-wheel 35 is pivoted, provided with a series of pins 36 in its forward face. The spur-wheel 35 meshes with a pinion 37, also pivoted upon the bracket, which pinion 37, through the medium of a wrist-pin and pitman 38, is connected with the drop-slide 13. The pin-wheel 35 is partially revolved at each movement of the lever 30, and this is accomplished by means of a bar 39, which bar is attached at its lower end to the lever and extends upward through suitable guideways formed upon the bracket. The edge of the bar 39 adjacent to the pins upon the pin-wheel 35 has produced therein a notch 40 to receive a pin 36 as the bar descends. A gravity-catch 36$^a$ is pivoted to the rear side of the bar 39 adjacent to the notch 40, one corner of which catch is bent around the bar, as shown, to limit its movement. The toe of the latch projects into the path of the pins 36. Immediately over the friction-roller 28 a weight 41 is adjustably secured to the rod or bar 29, the said weight being so attached as to present a forwardly-inclined lower edge to the friction-rollers.

In operation, as the implement is drawn forward the spring-fingers of the lower links of the endless chain engage with the ground when said links are in a horizontal position, and thereby revolve the entire endless chain, and as the links pass upward over the rear chain-wheel and also downward over front wheel the rods or links 26, connecting the fingers with the links of the chain, exert such tension upon the finger carried upward as to fold a finger close to the chain, as illustrated in Fig. 3, and thus prevent it from retarding the movement of the chain. As the chain revolves, the friction-pulleys 27, carried by the chain, engage with the under face of the adjustable weight 41 and elevate the same, and as the weight is connected to the rod 29 said rod is raised and also the lever 30, and the upward movement of the lever 30 causes the push-bar 39 to be carried upward also, whereupon the toe of the latch 36$^a$ yields and passes the pin 36, which is above the notch 40, and as the pulley 27 passes the weight 41 the bar 29 drops, carrying with it the lever 30 and bar 39, when the latch 36$^a$, engaging the pin 36, which it has just passed, partially revolves the wheel 35, causing the said wheel to impart a lateral movement to the seed drop-slide through the medium of the pinion 37 and pitman 38, and the lateral movement of the drop-slide permits the seed to drop from the seed-boxes to the ground. At the same time the marker 32 enters the ground to indicate a row. The wheel 35 is held from revolving during the upward movement of the bar 39 by the engagement of one of the pins 36 with a spring 35$^a$.

The rear section A' of the frame may be elevated in any suitable or approved manner to cause the chain B to disengage from the ground, and by reason of the rod-connection between the forward arm 21 and the rear arm 17 as the rear section of the frame is elevated the weight of the chain is equally distributed throughout its supports.

Having thus described our invention, we claim as new and desire to secure by Letters Patent—

1. In an implement of the character described, the combination, with a seed drop-bar, a lever, and an actuating mechanism connecting the lever and drop-bar, of an endless-chain belt, an adjustable weight connected with the lever, and friction-rollers carried by the belt and adapted for engagement with the weight, as and for the purpose specified.

2. In an implement of the character described, the combination, with the seed drop-bar, a lever, and an actuating mechanism connecting the lever and the said drop-bar, of an endless chain, an adjustable trip-weight connected with the lever, fingers carried by the chain and adapted for engagement with the ground, and friction-rollers pivoted upon the chain and adapted for engagement with the trip-weight, the said rollers regulating the spaces between the hills, substantially as and for the purpose specified.

3. In an implement of the character described, the combination, with a frame consisting of two sections, one hinged to the other, seed-boxes carried by the forward section, and a drop-bar sliding in said boxes, a lever fulcrumed to the forward section, and an actuating mechanism connecting the lever with the seed drop-bar, of an endless-chain belt carried by the rear section of the frame, a trip-weight adjustably connected with the lever, and friction-rollers carried by the chain and adapted for engagement with the trip-weight, as and for the purpose specified.

4. In an implement of the character described, the combination, with the seed drop-bar, a lever, and actuating mechanism connecting the lever with the seed drop-bar, of an endless chain, an adjustable trip-weight connected with the lever, friction-rollers carried by the chain and adapted for engagement with the trip-weight, and fingers having a pivoted connection with one link of the chain and a link-connection with the next link of the chain, substantially as and for the purpose specified.

5. In an implement of the character described, the combination, with a seed drop-bar, a lever, an actuating mechanism connecting the lever with the said drop-bar, and an adjustable trip-weight connected with the lever, of an endless chain, fingers having a pivoted and a link connection with the chain, friction-rollers carried by the chain and adapted for engagement with the trip-weight, and means for elevating the chain, as shown and described.

6. In an implement of the character described, the combination, with a seed drop-bar, weighted lever, and means for raising said lever and releasing it, of a pin-wheel connected with the seed drop-bar, a vertical bar connected with the weighted lever, and a gravity-latch on said bar adapted to engage said pin-wheel, substantially as and for the purposes specified.

ALBERT J. HELVERN.
WILLIAM B. SCHWALM.

Witnesses:
HENRY SCHWALM,
HARRY SHUMAN.